(12) United States Patent
Skarve et al.

(10) Patent No.: US 8,644,217 B2
(45) Date of Patent: Feb. 4, 2014

(54) ERROR RATE MANAGEMENT

(75) Inventors: Martin Skarve, Enebyberg (SE);
Anders Jonsson, Täby (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 430 days.

(21) Appl. No.: 12/937,488

(22) PCT Filed: Apr. 24, 2008

(86) PCT No.: PCT/SE2008/050469
§ 371 (c)(1),
(2), (4) Date: Oct. 12, 2010

(87) PCT Pub. No.: WO2009/131502
PCT Pub. Date: Oct. 29, 2009

(65) Prior Publication Data
US 2011/0026408 A1    Feb. 3, 2011

(51) Int. Cl.
*H04W 4/00* (2009.01)
(52) U.S. Cl.
USPC ........................................................ 370/328
(58) Field of Classification Search
USPC .......... 370/242, 235, 232, 329, 475, 230, 412
See application file for complete search history.

(56) References Cited

U.S. PATENT DOCUMENTS

| | | | |
|---|---|---|---|
| 6,788,697 B1 * | 9/2004 | Aweya et al. | 370/412 |
| 7,362,704 B2 * | 4/2008 | Sisto et al. | 370/230 |
| 7,463,616 B1 * | 12/2008 | Earnshaw et al. | 370/347 |
| 7,620,325 B2 * | 11/2009 | Mizutani et al. | 398/100 |
| 7,668,150 B2 | 2/2010 | Ofuji et al. | |
| 7,733,894 B1 * | 6/2010 | Giacobbe et al. | 370/415 |
| 7,889,692 B2 * | 2/2011 | Bi et al. | 370/328 |

(Continued)

FOREIGN PATENT DOCUMENTS

| JP | 2008-010905 A | 1/2008 |
|---|---|---|
| WO | WO 01/47144 A1 | 6/2001 |

(Continued)

OTHER PUBLICATIONS

International Search Report, PCT Application No. PCT/SE2008/050469, Jan. 26, 2009.

(Continued)

*Primary Examiner* — Chandrahas Patel
*Assistant Examiner* — Lan Truong
(74) *Attorney, Agent, or Firm* — Myers Bigel Sibley & Sajovec, P.A.

(57) ABSTRACT

The invention deals with the adjustment of the nominal target error rate for transmission of data from a priority queue to a new predetermined target error rate depending on the state of the priority queue. Usually, the adjustment to the new predetermined target error rate will be to a predefined lower target error rate based on states of the priority queue, such as amount of data in the priority queue, time passed since the latest transmission of data from the priority queue, whether the amount of data in the priority queue will fit into one transport block, whether the data unit to be transmitted for the priority queue is the first or last data unit in the priority queue and may also be based on the type of data stored in the priority queue. There may be more than one such priority queue.

17 Claims, 3 Drawing Sheets

(56) References Cited

U.S. PATENT DOCUMENTS

| | | | |
|---|---|---|---|
| 7,957,430 B2* | 6/2011 | Kashima et al. | 370/470 |
| 2003/0101387 A1* | 5/2003 | Lee | 714/704 |
| 2003/0142656 A1* | 7/2003 | Padovani et al. | 370/347 |
| 2003/0190926 A1* | 10/2003 | Harris et al. | 455/522 |
| 2004/0190486 A1* | 9/2004 | Oshiba | 370/349 |
| 2004/0264475 A1* | 12/2004 | Kowalski | 370/395.5 |
| 2006/0050723 A1* | 3/2006 | Yu | 370/412 |
| 2006/0084389 A1* | 4/2006 | Beale et al. | 455/67.11 |
| 2007/0155335 A1 | 7/2007 | Love et al. | |
| 2007/0280192 A1* | 12/2007 | Yagyu et al. | 370/349 |
| 2008/0008203 A1 | 1/2008 | Frankkila et al. | |
| 2008/0117843 A1* | 5/2008 | Ishii et al. | 370/310 |
| 2008/0186988 A1* | 8/2008 | Carmon et al. | 370/412 |
| 2010/0189045 A1* | 7/2010 | Takeshita et al. | 370/329 |
| 2010/0278152 A1* | 11/2010 | Andreozzi et al. | 370/335 |
| 2010/0284362 A1* | 11/2010 | Tajima et al. | 370/329 |
| 2011/0230172 A1* | 9/2011 | Pollin et al. | 455/414.1 |

FOREIGN PATENT DOCUMENTS

| | | |
|---|---|---|
| WO | WO 03/71740 A1 | 8/2003 |
| WO | WO 2005/025084 A1 | 3/2005 |
| WO | WO 2006/088401 A1 | 8/2006 |
| WO | WO 2006/118491 A1 | 11/2006 |
| WO | WO 2007/056182 A1 | 5/2007 |

OTHER PUBLICATIONS

Written Opinion of the International Searching Authority, PCT Application No. PCT/SE2008/050469, Jan. 26, 2009.

Supplementary European Search Report, PCT Application No. PCT/SE2008/050469, Dec. 30, 2011.

Japanese Office Action Corresponding to Japanese Patent Application No. 2011-506224; Date of Mailing; Nov. 20, 2012; Foreign Text, 3 Pages, English Summary, 1 Page.

\* cited by examiner

ERROR RATE MANAGEMENT

CROSS REFERENCE TO RELATED APPLICATION

This application is a 35 U.S.C. §371 national stage application of PCT International Application No. PCT/SE2008/050469, filed on 24 Apr. 2008, the disclosure and content of which is incorporated by reference herein in its entirety. The above-referenced PCT International Application was published in the English language as International Publication No. WO 2009/131502 A1 on 29 Oct. 2009.

TECHNICAL FIELD

The present invention is related to data transmission in wireless communication networks. More specifically, it is related to managing of target error rates for data transmission.

BACKGROUND OF THE INVENTION

Recent development in wireless network technology has led to the introduction of new wireless communication networks with ever increasing data bandwidths and peak data rates. As a consequence, a number of new more or less bandwidth intensive applications have been introduced as services in the wireless network, such as audio and video streaming services, VoIP (Voice-over-IP), online multiplayer computer games and so on. These new services co-exist with standard services, such as interactive and conversational data traffic. With some services, data throughput is the important parameter, while other services require low data transmission delay or latency for maximum user satisfaction.

Figure 1:
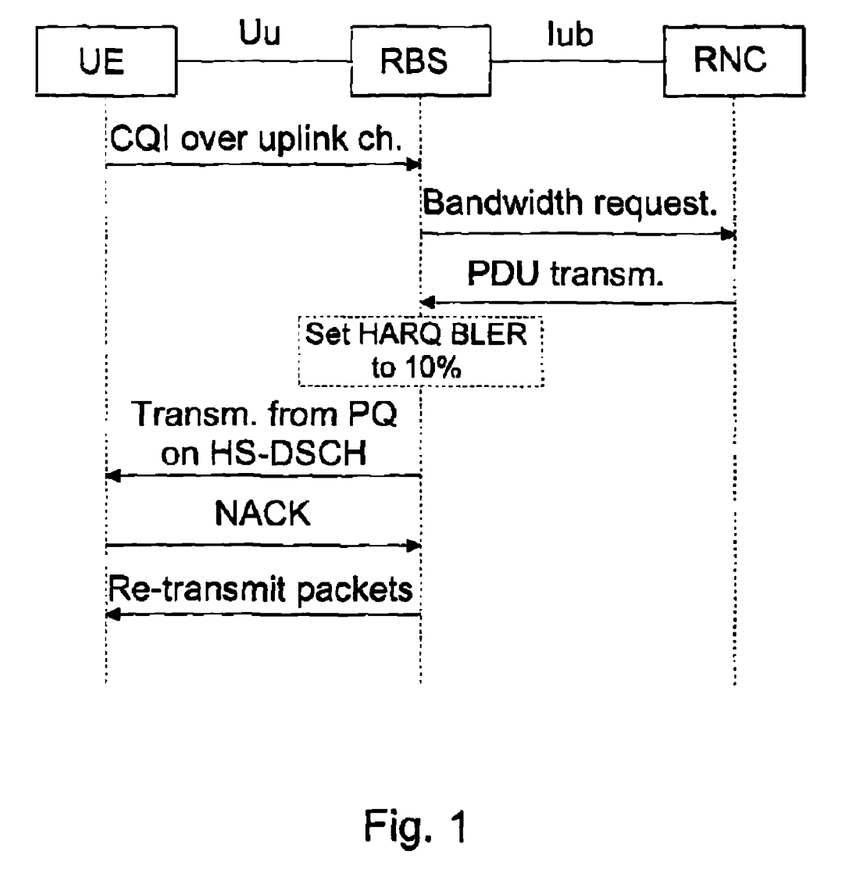
FIG. 1 illustrates a wireless communication network according to known technology.

According to the 3GPP (Third Generation Partnership Project) standard for HSDPA (High Speed Downlink Packet Access), a mobile terminal (UE—User Equipment) shall report a perceived radio channel quality over the air interface to a UTRAN (Universal Terrestrial Radio Access Network). This is reported by means of a Channel Quality Indicator (CQI) information element contained in an associated uplink signaling channel HS-DPCCH (High Speed Downlink Physical Control Channel). The CQI value reported by the UE reflects the UE's perceived channel quality and indicates the UE's capability to decode the user data sent on the HS-DSCH (High Speed Downlink Shared Channel) and is used by the UTRAN for UE scheduling, power management and transport block (TB) selection. The standard mandates that the UE CQI report should target a data error rate of 10%. In the example case of a HSPDA-network, this data error rate is expressed as a HARQ BLER (Hybrid Automatic Repeat Request Block Error Rate) parameter. These principles are illustrated in FIG. 1.

Typically, HS-DSCH systems target a certain BLER value in order to maximize the cell throughput and it is common practice in networks today to aim at a HARQ BLER of 10%.

However, the HSDPA-standard does not rule out the possibility to target other values of the HARQ BLER-parameter than 10%.

While such a BLER target has advantages concerning cell throughput it also has the disadvantage that there is a 10% chance that there will be a retransmission on the HS-DSCH leading to a reduction in the user perceived throughput and data transmission delays. Especially the latter factor may lead to deterioration in the user perceived quality of streaming audio and/or video services, online gaming, VoIP and voice conversations. On the other hand a lower HARQ BLER target may lead to a higher probability of a successful data transmission but consumes more power per bit than a transmission targeting a higher BLER value.

Applications such as VoIP, gaming and transmissions of control data from higher layers, such as TCP (Transmission Control Protocol) control data from the network layer place other requirements on the radio channel than simply maximum throughput, such as, for example, low latency.

Thus, the aim of the present invention is to solve at least some of the problems associated with known technology.

SUMMARY OF THE INVENTION

One solution according to the present invention to at least some of the problems with known technology mentioned above is related to a method for managing a target error rate for a data transmission in a wireless communication network, where the method comprises the steps:
- analyzing the state of at least one data queue comprising data to be transmitted;
- determining a target error rate for the data to be transmitted based on the analysis of the state of the at least one data queue and;
- applying the determined target error rate to the data transmitted from the at least one data queue.

The method according to the present invention has the advantage that it permits the use of a default target error rate optimized for cell throughput for most data transmissions while adding the possibility to target a lower target error rate for data packets which for example may be sensitive to delay.

Another aspect of the present invention is related to a node for communication in a wireless communication network where the node comprises a receiver/transmitter combination for receiving and transmitting data over a radio interface, a buffer unit for storing data which is to be transmitted over the radio interface; a scheduling unit for scheduling data from the buffer unit for transmission over the radio interface, a measurement unit configured to supply information indicative of the state the buffer unit and a processing unit configured to determine the state of the buffer unit based on the information supplied by the measurement unit, where the base station further comprises means for determining a target error rate depending on the state of the buffer unit, where the processing unit is configured to apply the determined target error rate to data to be transmitted from the buffer unit and to instruct the scheduling unit to schedule data from the buffer unit for transmission based on the determined target error rate.

It should be mentioned that the node according to the present invention is especially suited for executing the steps of the method according to the present invention.

Also, one other aspect of the present invention is related to a computer program product for managing a target error rate for a data transmission in a wireless communication network. This computer program product comprises instruction sets for:
- analyzing the state of at least one data queue comprising data to be transmitted;
- determining a target error rate for the data to be transmitted based on the analysis of the state of the at least one data queue and;
- applying the determined target error rate to the data transmitted from the at least one data queue.

It should be added that the computer program product according to the present invention is especially suited to implement the steps of the method according to the present invention and where the instruction sets of the computer program product are suited to be executed in the node of the present invention described earlier.

These and other advantages will be more readily understood by studying the detailed description and the accompanying drawings of this patent application.

DETAILED DESCRIPTION OF PREFERRED EMBODIMENTS

FIG. 1 illustrates signaling and data transmission in a wireless communication network according to known technology. Specifically, the wireless communication network in this case is an HSDPA-network.

In this illustration, only the relevant part of the wireless communication network is shown, that is, an RBS (Radio Base Station) and an RNC (Radio Network Controller) connected via an Iub interface. Moreover, the RBS connected to a mobile terminal (UE) via a Uu interface.

In an HSDPA-network the RBS may base the choice of transport format, i.e. modulation and coding for the data to be transmitted over the air interface on the CQI-value received from the UE. As mentioned before, the RBS chooses the modulation and coding values and also the output power for the data to be transmitted in order to reach a certain BLER-target. This BLER-target is usually identified as 10%, meaning it is aimed at transmitting the data targeting the UE in such a way that 90% of the transmissions are correctly decoded.

The transport blocks in the HSDPA-network may be transported on a high-speed data channel, namely the HS-DSCH:

In case the data is not received correctly by the UE, the UE transmits a NACK (Not Acknowledged) message back to the RBS informing the RBS that the block transmitted was incorrectly received. Thereafter, the RBS may retransmit the transport block using ARQ (Automatic Repetition Request) or HARQ (Hybrid Automatic Repetition Request) which are known to the skilled person. It should be mentioned here that the ACK/NACK signaling (Acknowledged/Not Acknowledged) is influenced by different HARQ BLER targets, since higher HARQ BLER values potentially also mean more frequent retransmissions of transport blocks.

Figure 2:
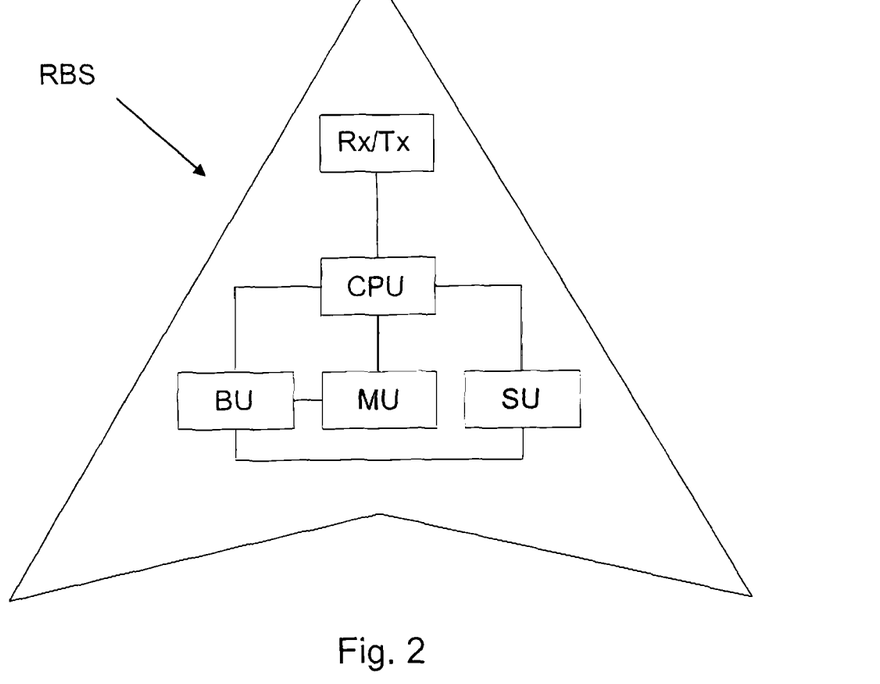
FIG. 2 illustrates a base station according to one embodiment of the present invention.

Turning now to FIG. 2, an illustration of a base station RBS according to one embodiment of the present invention is shown. Even if the description of the RBS in this embodiment will focus on its implementation into a HSDPA-network it should be borne in mind that the RBS illustrated in FIG. 2 may be employed in any wireless communication network where there are different classes of data traffic and where the data traffic is either heavily dependent on data throughput or latency or some compromise of both of these parameters and where data is buffered before being transmitted over the air interface. Also, the RBS in FIG. 2 may comprise any node in a wireless communication network, such as a base station, Node B, access point or some other node capable of communication with one or more mobile terminals over an air interface and with a remaining part of the wireless communication network via a wired or wireless interface.

Returning to FIG. 2, the RBS in FIG. 2 comprises a receiver/transmitter combination Rx/Tx, a processing unit CPU, a buffer unit BU, a measurement unit MU and a scheduling unit SU.

Using the receiver/transmitter combination Rx/Tx the base station RBS is able to transmit control and user data over an air interface (such as the Uu interface in FIG. 1) to a mobile terminal UE, shown in FIG. 1. Also, using the receiving part (not shown) of the receiver/transmitter combination Rx/Tx the RBS may receive user data and control signalling from one or more mobile terminals UEs, but also information on channel quality over the air interface in the form of CQI-reports. CQI reports are sufficiently known to the skilled person and will not be elaborated here.

These received CQI-reports may then be used by the processing unit CPU in order to assess which user to schedule, what power to use and which transport format to use for the data to be transmitted to the UE that delivered the CQI-report, which per se is known to the skilled person. However it is also known to use other means of estimating the channel quality over the air interface, such as registering the number of ACK and NACK messages received from the UE.

Moreover, the RBS comprises a buffer unit BU which may buffer PDUs (Packet Data Units) belonging to one data flow received from, for example an RNC as illustrated in FIG. 1, into a priority queue. The buffer unit BU may comprise many such priority queues (PQs), where data belonging to more than one service used by one user is stored in one PQ before being scheduled for transmission over the air interface. Examples of services which may be used separately or in combination by one user may be audio and/or video streaming data services, VoIP-services, interactive type of data services, conversational services and others.

Furthermore, the RBS according to the embodiment in FIG. 2 of the present invention also comprises a measurement unit MU connected to the buffer unit MU. The task of the measurement unit MU is to measure the length of the one or more priority queues and also the time passed since the latest transmission of data from the priority queue PQ. These measurements may be performed during specific time periods whereafter the MU is adapted to forward the measurement values to the CPU.

One way of determining the length of the PQ may be to count the number of data units, such as data octets or some other type of data units in the PQ using the measurement unit MU. On the other hand, one way of performing time measurement in the MU may be to register the time stamp of the latest data unit transmitted from the one or more PQs and to compare it to an internal clock (not shown) in the RBS. The difference between these two values will then be the time passed since the latest transmission of a data unit from the one or more PQs.

Now the processing unit CPU is configured to, based on the measurement values received from the measurement unit MU, determine the PQs which should be given priority for transmission and to determine a target error rate increasing the probability of safe reception of the data from these PQs. In an HSPDA scenario this target error rate may be a target HARQ BLER, in other scenarios a BLER or BER (Bit Error Rate) value. In one variant of the present invention, the processing unit CPU according to the present invention may be configured to determine which PQs to prioritize for transmission by comparing the queue length value received from the measurement unit MU with a predefined threshold value X. PQs with less than X octets of data are given a higher relative priority as compared to PQs storing data with the same or higher priority class containing more data. X can for example be 100 octets of data, which will include TCP (Transmission Control Protocol) control signaling and small ping messages. However, it should be mentioned, that data in the PQs may be organized into data units smaller or greater than one data octet, depending on implementation in the specific wireless communication network. At the same time, the processing unit CPU is configured to determine a target error rate for the PQs with less than X octets of data which is lower than a default target error rate. In certain wireless communication networks, such as HSDPA-networks, the default target error rate is a HARQ BLER value of 10%, while according to the solution of the present invention the lower target error rate determined for the PQs which are given priority for transmission by the processing unit CPU may for example be 1%.

Also, the processing unit CPU may use the time value received from the measurement unit MU indicative of the time passed since the latest transmission of a data unit from the one or more PQs as either an additional or a separate selection criterion in the choice of which PQs should be scheduled for transmission. From this criterion, the processing unit CPU may then determine the appropriate target error rate which would increase the probability of safe reception of the data from the PQs which are scheduled for transmission by the processing unit CPU. Similar to the previous case where the queue length of the PQ is the deciding factor, the target error rate may be chosen to be lower than a nominal target error rate for those PQs where the latest transmission occurred at a time greater than a predefined threshold time value T.

In one variant of the PQ length and time measurement performed by the measurement unit MU, the processing unit CPU may from the measurement values received decide whether one or more data units in a PQ are the first or last data units in the PQ. Thus, for example, the processing unit CPU may be configured to recognize that one or more data units are the first data units in a PQ if the PQ length value is less than X octets and the amount of time passed since the latest transmission is greater than the predetermined threshold time value T. On the other hand, the processing unit CPU may be configured to recognize that one or more data units are the last data units in the PQ if the PQ length value is less than X octets and the time passed since the latest data transmission from the PQ is less than the predetermined threshold time value T. The processing unit CPU may then be configured to prioritize the first or last data units in a PQ for transmission and to determine the appropriate target error rate for these data units which is lower than the default target error rate mentioned earlier in the text.

Additionally, one other criterion which may be used by the processing unit CPU according to the present invention is to receive the PQ length value from the measurement unit and to compare the number of data units in the PQ with a predefined transport block (TB) size.

In the event that the processing unit CPU determines the amount of data units in the PQ to be containable in the predefined TB, the processing unit CPU according to the present invention may be similarly to the previous criterions configured to determine a target error rate lower than a default target error rate for the data units from the PQ scheduled for transmission. It should be mentioned here that the TB size may vary from one TTI (Transmission Time Interval) to another. Here, the TTI parameter describes the time interval during which data can be transmitted from the RBS to the UE.

In another variant of the present invention, the processing unit CPU may depending on the queue length values measured by the measurement unit MU be configured to select data from one PQ for transmission and to determine a target error rate lower than a nominal target error rate for this data if the number of data units in the PQ can be transmitted during one TTI. As a consequence, data units from the PQ selected for transmission may be transmitted in one or more than one TB. Additionally, the processing unit CPU may before selecting data from a certain PQ for transmission, determine the type of data contained in the PQ. In this fashion, PQs with delay sensitive data may be given priority compared to PQs containing data units carrying less delay sensitive data traffic.

Finally, the scheduling unit SU, connected to the buffer unit BU and the processing unit SU is responsible for the scheduling of data units from the one or more PQs selected by the processing unit CPU for transmission over the air interface. Normally, the scheduling unit SU is instructed by the processing unit CPU to schedule these data units for transmission after the latter has selected one or more PQs as prioritized for transmission and determined a target error rate for them. The functioning principle of a scheduling unit in an RBS is known to the skilled person and will not be elaborated further.

Figure 3:
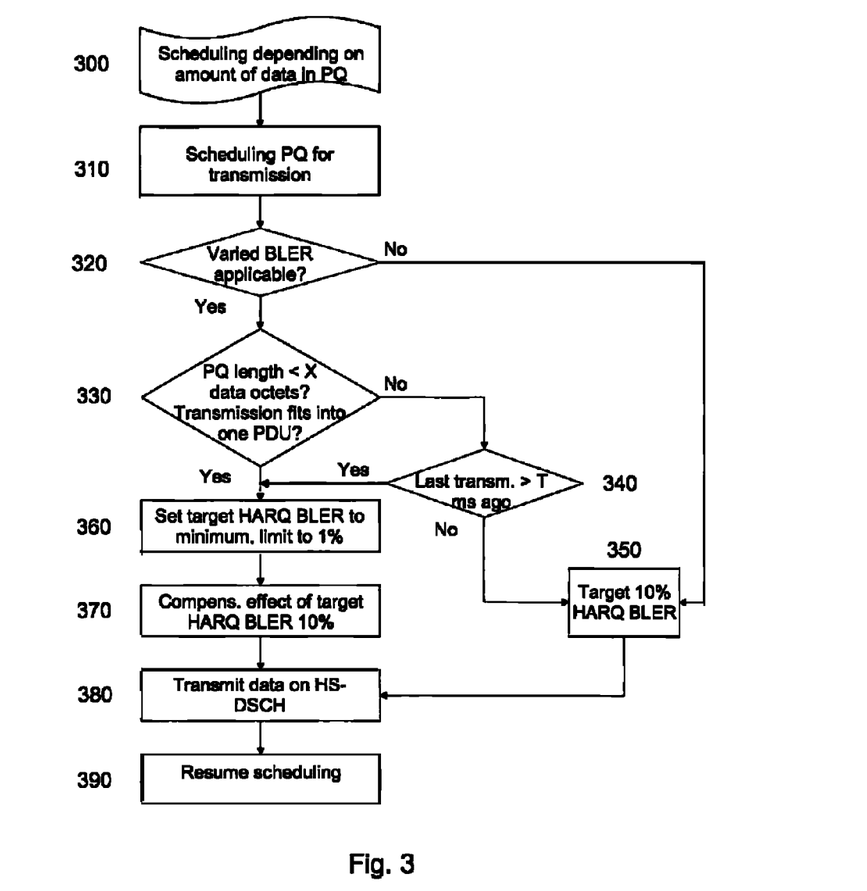
FIG. 3 illustrates in flow chart form an embodiment of the method of the present invention.

The flow chart in FIG. 3 gives a graphical illustration of one embodiment of a method according to the present invention. Even though the method is described in an HSDPA-implementation it should be pointed out that the present method can be applied in any wireless communication network where data are prestored in data queues before being scheduled for transmission over an air interface.

Now, as a first step, at 300, the method enters the procedure for scheduling of data in one or more PQs depending on the amount of data in these PQs. Here, in this specific example, the data in the PQs is present in octets. But it should be understood that any type of organization of data in the PQ is possible, thus also data units organized into units less or greater than one octet.

At the next step, at 310, data in one PQ out of a plurality of PQs is selected to be scheduled for transmission by a scheduling unit, such as the scheduling unit SU in the base station RBS of FIG. 2. The selection of one specific PQ to be scheduled for transmission may be based on a priority algorithm (not shown) where one or more PQs having the least amount of data compared to all other PQs are scheduled for transmission. However, this priority algorithm may be employed further down in the method illustrated by the flow chart in FIG. 3.

The reason for selecting the PQs with the least amount of data to be scheduled for transmission is the fact that after the transmission of a relatively few number of data units from the PQ data transmission from these PQs can be finished relatively rapidly with a relatively small number of transmissions and retransmissions. In contrast, PQs with larger amounts of data will need more signaling and more time for data transmission Thus, according to the priority algorithm for selection of PQs in this example. PQs having the least amount of data, will be favored before PQs with larger amounts of data, even if the latter group of PQs may have data of higher priority class stored in them. As an example, streaming and conversational classed of data may be those higher class data.

At step 320, it is determined whether variable target HARQ BLER is applicable for the type of data that resides in the PQ. If not, then the rest of the functionality is bypassed and at step 350 a default HARQ BLER value usually targeted by the system is used. This default value for the HARQ BLER may vary from network to network, depending on implementation. One example value used in HSDPA-networks is 10%, meaning that the network aims at transmitting 90% of all data over the air interface correctly. It should be mentioned here that in addition to checking at step 320 whether variable HARQ BLER is applicable for the data in the one or more PQs, the priority algorithm for selection of one or more PQs from step 310 may be applied at step 320 instead—either as an alternative to the test of whether varied HARQ BLER is applicable or together with it.

If at step 320 it is determined that the data in the PQ belongs to a service for which the system is configured to target a variable HARQ BLER, then it is determined in the next step 330 if the data contained in the PQ is less than X octets of data and/or if this data will fit into one MAC-hs or MAC-ehs TB (Media Access Control high speed Transport Block or Media Access Control enhanced high speed Transport Block) given the current channel conditions and power available. It should also be mentioned that in some cases data from the PQ may be transmitted even if it does not fit into one transport block. For example if it is determined that the quality of the radio channel over the air interface has deteriorated data from the PQ may also be transmitted in more than one transmission block. Also, one other situation whether a PQ may be prioritized for transmission even though the data units in the PQ may not be contained in one TB is when the entire PQ can be transmitted during one TTI mentioned in the description of FIG. 2 earlier. This may be coupled with the condition that data units in the PQ not being containable in one TB should carry data traffic sensitive to delay.

Returning to the description of step 330, if neither criterion is fulfilled, i.e. less than X octets of data in the PQ or the data in the PQ not fitting into one transport block, then an evaluation is performed at step 340 to determine how long ago the latest transmission from this PQ occurred. If this was longer than T ms ago, then the system shall determine a target HARQ BLER at step 360 given the power and channel conditions. This target HARQ BLER is chosen such that the probability of reception of data units from the PQ selected is increased and the probability of retransmission of these data units is minimized. One example implementation of the minimum target HARQ BLER may be 1% meaning that the network aims at transmitting 99% of all data from the one or more PQs correctly.

If the last data transmission from the PQ occurred at a shorter or equal time than T ms then the nominal target HARQ BLER value is chosen at step 350.

In one other variant of the method according to the present invention, the processing unit CPU of the RBS may at an additional step (not shown) determine whether a data unit in a PQ is a first or a last data units in the PQ. This may be done in the same fashion as in the description of FIG. 2. Especially if the first or last data units in the PQ carry delay sensitive data traffic, their transmission may be prioritized. For these data units, the processing unit CPU may determine a target HARQ BLER lower than the nominal target HARQ BLER.

Returning to the description of step 360, the time parameter T can typically be slightly less than the latency in the system, i.e. the time it takes for the network to transmit one transport block to one mobile terminal (UE) over the air interface. If at step 330 it is determined that the data is less than X octets and will fit into one MAC-hs or MAC-ehs TB then the system will also determine a lower target HARQ BLER at step 360 given the power and channel conditions. Again, this lower target HARQ BLER value may be limited to 1%.

If the system employs HARQ ACK's and NACK's for targeting a particular BLER, then there may be a need to compensate this mechanism due to the different ACK/NACK characteristics associated with TTI (Transmission Time Intervals) for which the alternative 1% HARQ BLER targeting was employed. This may be performed in the optional step 370.

Finally, when it has been determined whether the system shall target a lower target HARQ BLER or the nominal target HARQ BLER then the system is ready to transmit the data at step 380. In an HSDPA-implementation of the method according to the present invention, the data from one or more PQs selected for transmission may be transmitted on a HS-DSCH (High-Speed Downlink Shared Channel).

The change of target HARQ BLER may result in a change of output power, number of codes used for coding the data to be transmitted, modulation mode for the data or some other means for adjusting the data to be transmitted to the changed target HARQ BLER as is known to the skilled person Finally, at step 390, the method returns to scheduling new data from one or more PQs for transmission.

It should be added that the present invention may also function in a scenario where more than one of the criterions mentioned in the description of the method steps in FIG. 3 can be combined to determine whether data in one or more PQs in a base station is to be transmitted with a lower predetermined target HARQ BLER. Also, the amount of time since the latest data transmission from the PQ, the amount of data octets in the PQ or the type of data traffic in the PQ may used in isolation as the criterion for selecting a lower target HARQ BLER.

The main advantage of the invention is that it introduces the possibility to have different HARQ BLER and/or scheduling priority for the transmission of small isolated data packets as compared to more continuous data transmissions. An important advantage associated with this is in the case of benchmarking tests both in terms of peak throughput and for so called "ping" tests used to gauge system latency. In both these scenarios it is important that small packets are prioritized. For "ping" tests aimed at measuring the latency in the system the advantage is self evident. In the case of peak throughput, the gain can be explained by the fact that protocol control and status reports (e.g. TCP SYN, ACK, SYN/ACK or RLC and TCP status reports), which are sent in small isolated packets, have an impact on the peak rate attainable and a delay of such reports due to HARQ retransmissions has a detrimental effect on download times and the maximum peak rate possible.

The property to prioritize small data packets that are transmitted intermittently is also of particular importance for delay sensitive services like online gaming where multiple users interact in real-time or as close to real time as possible. In these cases, a low HARQ BLER and low delay is needed in order to attain customer satisfaction.

The invention claimed is:

1. A method for managing a target error rate for a wireless data transmission in a wireless communication network, the method comprising: analyzing a state of at least one data queue comprising data to be transmitted, wherein the analyzing a state of at least one data queue comprises comparing a number of data units in the at least one data queue with a predefined threshold value; determining a target error rate for the data to be transmitted based on the analyzing a state of at least one data queue; wirelessly transmitting the data to be transmitted from the at least one data queue at the target error rate for the data that was determined; and setting the target error rate to a value lower than a default target error rate if the number of data units in the at least one data queue is less than the predefined threshold value.

2. A method according to claim 1, wherein the analyzing a state of at least one data queue comprises determining an amount of data units in the at least one data queue.

3. A method according to claim 1, wherein the analyzing a state of at least one data queue comprises determining an amount of time passed since a latest data transmission from the at least one data queue.

4. A method according to claim 3, wherein the amount of time passed since the latest data transmission from the at least one data queue is determined by comparing a difference between a current time and a time a latest data unit was transmitted from the data queue with a predetermined threshold time value.

5. A method according to claim 1, wherein the determining a target error rate comprises determining the target error rate, such that the target error rate is lower than a default target error rate when a difference between a current time and a time a latest data unit was transmitted is greater than a predetermined threshold time value.

6. A method according to claim 1, wherein the analyzing a state of at least one data queue further comprises determining whether a data unit in the data queue is a first or a last data unit in the at least one data queue.

7. A method according to claim 1, wherein the analyzing a state of the at least one data queue comprises determining a priority of the at least one data queue based on a comparison of a length of two or more data queues and/or a time passed since a latest transmission of data from the two or more data queues.

8. A method according to claim 1, wherein the analyzing a state of at least one data queue comprises determining whether an amount of data in the at least one data queue can be contained in one data transport block.

9. A method according claim 8, wherein the data transport block comprises a MAC-hs (Media Access Control high speed) or a MAC-ehs (Media Access Control enhanced high speed) transport block.

10. A method according to claim 1, wherein analyzing the state of the at least one data queue comprises determining a type of data stored in the at least one data queue and assigning a priority to the data stored in the at least one data queue based on the type of the data that was determined, and
wherein determining the target error rate for the data to be transmitted comprises determining the target error rate based on the priority that was assigned to the data.

11. A method according to claim 1, further comprising adjusting an output power and/or a coding for the data to be transmitted from the at least one data queue in order to reflect the target error rate that was determined.

12. A method according to claim 1, wherein the at least one data queue comprises a priority queue in a radio base station.

13. A node for communication in a wireless communication network, the node comprising:
a receiver/transmitter combination configured to receive and transmit data over a radio interface;
a buffer unit configured to store data to be transmitted over the radio interface;
a scheduling unit configured to schedule data from the buffer unit for transmission over the radio interface;
a measurement unit configured to supply information indicative of a state of the buffer unit; and
a processing unit configured to:
determine the state of the buffer unit based on the information supplied by the measurement unit, wherein the determining the state of the buffer unit comprises comparing a number of data units in the buffer unit with a predefined threshold value,
determine a target error rate depending on the state of the buffer unit, wherein the target error rate is set to a value lower than a default target error rate if the number of data units in the buffer unit is less than the predefined threshold value,
apply the target error rate that was determined to the data to be transmitted over the radio interface, and
instruct the scheduling unit to schedule data from the buffer unit for transmission over the radio interface based on the target error rate that was determined.

14. A node according to claim 13, wherein the state of the buffer unit comprises an amount of data stored in the buffer unit.

15. A node according to claim 13, wherein the state of the buffer unit comprises an amount of time passed since a latest data transmission from the buffer unit.

16. A node according to claim 13, wherein the processing unit is further configured to determine from the information received from the measurement unit whether an amount of data units in the buffer unit can be contained in a data transport block.

17. A computer program product for managing a target error rate for a data transmission in a wireless communication network—the computer program comprising computer-readable instruction sets stored in a non-transitory computer-readable medium, the instruction sets comprising:
a first computer-readable instruction set configured to analyze a state of at least one data queue comprising data to be transmitted, wherein to analyze the state of the at least one data queue comprises comparing a number of data units in the at least one data queue with a predefined threshold value;
a second computer-readable instruction set configured to determine a target error rate for the data to be transmitted based on the state of the at least one data queue that was analyzed, wherein the target error rate is set to a value lower than a default target error rate if the number of data units in the at least one data queue is less than the predefined threshold value; and
a third computer-readable instruction set configured to apply the target error rate that was determined to the data to be transmitted from the at least one data queue.

* * * * *

UNITED STATES PATENT AND TRADEMARK OFFICE
CERTIFICATE OF CORRECTION

PATENT NO. : 8,644,217 B2  
APPLICATION NO. : 12/937488  
DATED : February 4, 2014  
INVENTOR(S) : Skarve et al.

Page 1 of 1

It is certified that error appears in the above-identified patent and that said Letters Patent is hereby corrected as shown below:

In the Specification

Column 6, Line 51, delete "example." and insert -- example, --, therefor.

Signed and Sealed this
Sixteenth Day of September, 2014

Michelle K. Lee
*Deputy Director of the United States Patent and Trademark Office*